US012613915B2

(12) United States Patent
Schalkwyk et al.

(10) Patent No.: US 12,613,915 B2
(45) Date of Patent: Apr. 28, 2026

(54) STRUCTURED VIDEO DOCUMENTS

(71) Applicant: Google LLC, Mountain View, CA (US)

(72) Inventors: Johan Schalkwyk, Scarsdale, NY (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/961,038

(22) Filed: Nov. 26, 2024

(65) Prior Publication Data

US 2025/0094491 A1     Mar. 20, 2025

Related U.S. Application Data

(63) Continuation of application No. 18/177,747, filed on Mar. 2, 2023, now Pat. No. 12,169,522.

(Continued)

(51) Int. Cl.
*G06F 16/783* (2019.01)
*G06F 16/738* (2019.01)
(Continued)

(52) U.S. Cl.
CPC ........ *G06F 16/7844* (2019.01); *G06F 16/739* (2019.01); *G06F 40/169* (2020.01); *G06F 40/30* (2020.01)

(58) Field of Classification Search
CPC .............. G06F 16/7844; G06F 16/739; G06F 16/7834; G06F 16/74; G06F 40/169;
(Continued)

(56) References Cited

U.S. PATENT DOCUMENTS

| | | | |
|---|---|---|---|
| 6,434,520 B1 | 8/2002 | Kanevsky et al. | |
| 9,741,337 B1 | 8/2017 | Shastry et al. | |

(Continued)

FOREIGN PATENT DOCUMENTS

| | | |
|---|---|---|
| JP | H10507554 A | 7/1998 |
| WO | 2021101510 A1 | 5/2021 |
| WO | 2022015356 A1 | 1/2022 |

OTHER PUBLICATIONS

Japanese Office Action for the related Application No. 2024-552463 dated Oct. 21, 2025.

(Continued)

*Primary Examiner* — Huawen A Peng
(74) *Attorney, Agent, or Firm* — Honigman LLP; Brett A. Krueger; Grant Griffith

(57) ABSTRACT

A method includes receiving a content feed that includes audio data corresponding to speech utterances and processing the content feed to generate a semantically-rich, structured document. The structured document includes a transcription of the speech utterances and includes a plurality of words each aligned with a corresponding audio segment of the audio data that indicates a time when the word was recognized in the audio data. During playback of the content feed, the method also includes receiving a query from a user requesting information contained in the content feed and processing, by a large language model, the query and the structured document to generate a response to the query. The response conveys the requested information contained in the content feed. The method also includes providing, for output from a user device associated with the user, the response to the query.

20 Claims, 6 Drawing Sheets

Related U.S. Application Data

(60) Provisional application No. 63/268,921, filed on Mar. 4, 2022.

(51) Int. Cl.
   *G06F 40/169*    (2020.01)
   *G06F 40/30*    (2020.01)

(58) Field of Classification Search
   CPC ......... G06F 40/30; G06N 3/096; G10L 15/26; G10L 15/22; G10L 15/04; G10L 15/16
   See application file for complete search history.

(56)           References Cited

U.S. PATENT DOCUMENTS

| | | | |
|---|---|---|---|
| 9,875,742 B2 | 1/2018 | Gorodetski et al. | |
| 10,304,458 B1* | 5/2019 | Woo | G10L 17/02 |
| 10,847,175 B2 | 11/2020 | Yeh et al. | |
| 11,544,590 B2* | 1/2023 | Kim | G06N 3/0464 |
| 2003/0194210 A1 | 10/2003 | Shiiyama | |
| 2009/0043581 A1 | 2/2009 | Abbott et al. | |
| 2014/0035920 A1 | 2/2014 | Duwenhorst | |
| 2014/0142940 A1 | 5/2014 | Ziv et al. | |
| 2017/0052982 A1* | 2/2017 | Sirven | G06F 16/5866 |
| 2017/0060823 A1* | 3/2017 | Zheng | G06F 3/0482 |
| 2017/0147576 A1 | 5/2017 | Des Jardins | |
| 2018/0025222 A1* | 1/2018 | Yellapragada | G06V 30/416 |
| | | | 382/176 |
| 2019/0138809 A1 | 5/2019 | Doshi et al. | |
| 2019/0156816 A1 | 5/2019 | Singh et al. | |
| 2019/0188328 A1 | 6/2019 | Oyenan et al. | |
| 2019/0259377 A1 | 8/2019 | Mertens et al. | |
| 2019/0392208 A1* | 12/2019 | Zhou | G06F 40/106 |
| 2021/0012222 A1 | 1/2021 | Kim | |
| 2023/0260519 A1 | 8/2023 | Medalion et al. | |
| 2023/0260520 A1 | 8/2023 | Medalion et al. | |

OTHER PUBLICATIONS

Shigeki Ohira: "Multimedia Retrieval System by Voice using Portable Information Terminal", The 36th Workshop on Language and Speech Understanding and Dialogue Processing (SIG-SLUD-A202), Japan, The Japanese Society for Artificial Intelligence, Nov. 7, 2002, pp. 51-54.

* cited by examiner

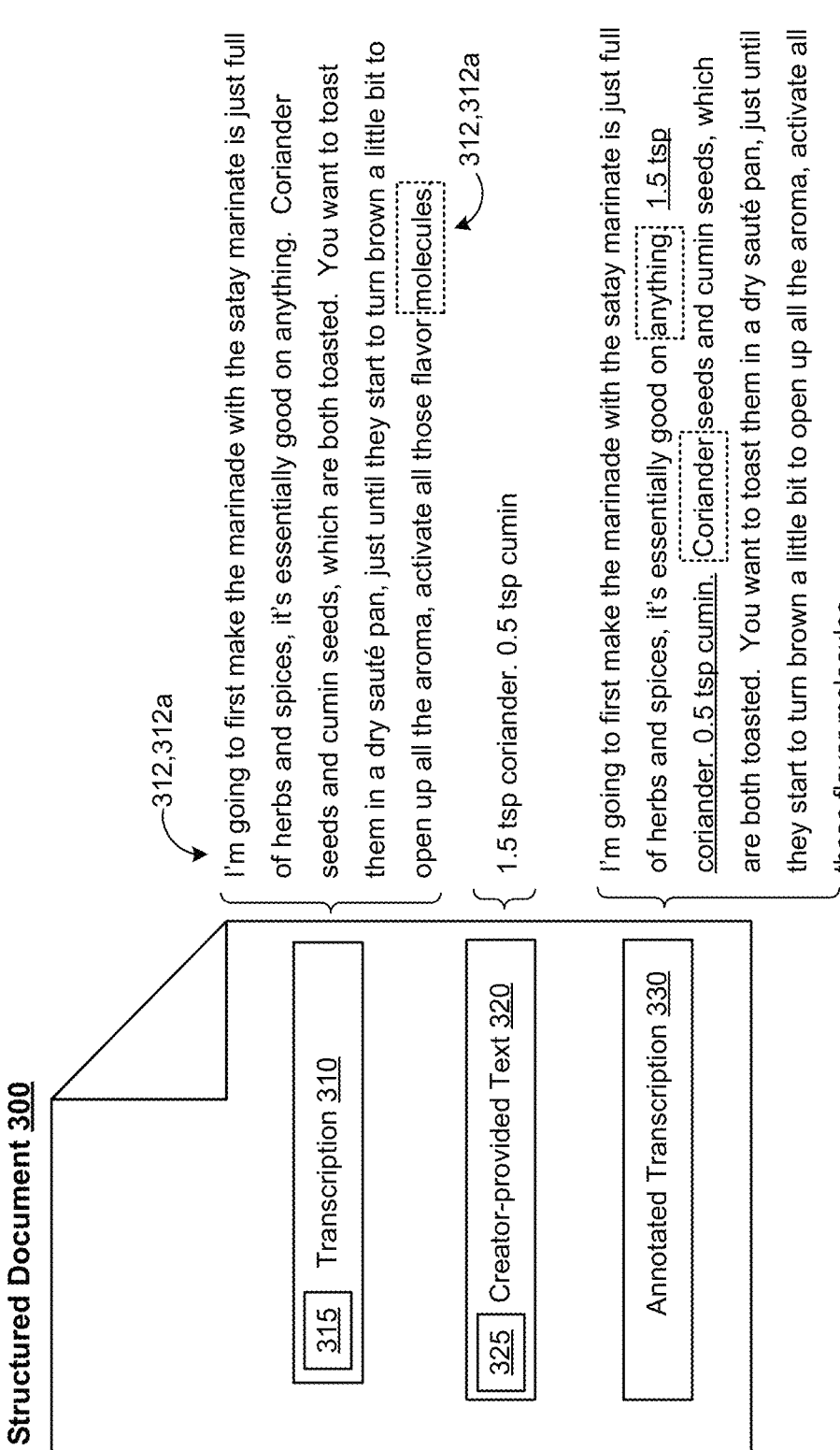

Structured Document 300

315 Transcription 310

312,312a

I'm going to first make the marinade with the satay marinate is just full of herbs and spices, it's essentially good on anything. Coriander seeds and cumin seeds, which are both toasted. You want to toast them in a dry sauté pan, just until they start to turn brown a little bit to open up all the aroma, activate all those flavor molecules.

325 Creator-provided Text 320

1.5 tsp coriander. 0.5 tsp cumin

Annotated Transcription 330

312,312a

I'm going to first make the marinade with the satay marinate is just full of herbs and spices, it's essentially good on anything. 1.5 tsp coriander. 0.5 tsp cumin. Coriander seeds and cumin seeds, which are both toasted. You want to toast them in a dry sauté pan, just until they start to turn brown a little bit to open up all the aroma, activate all those flavor molecules.

FIG. 3

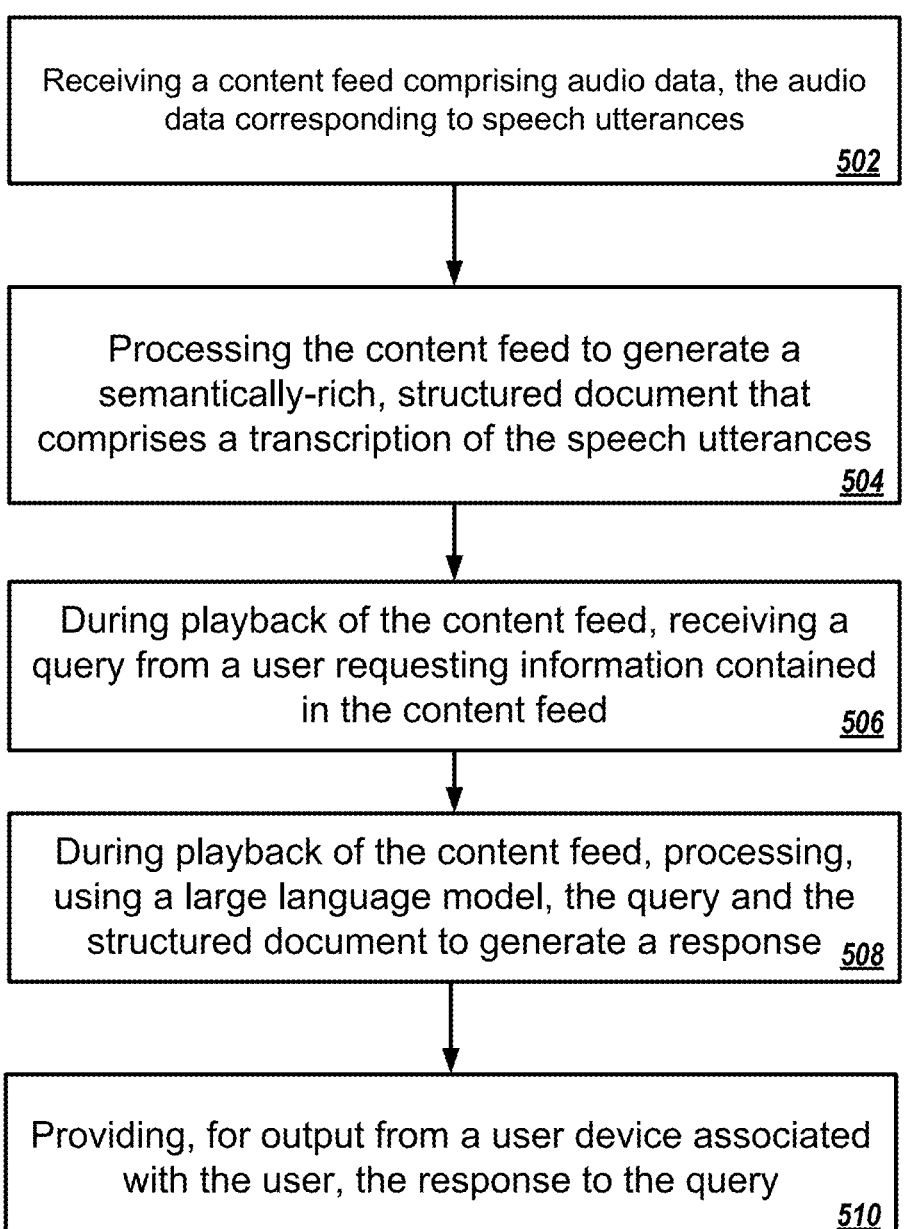

Receiving a content feed comprising audio data, the audio data corresponding to speech utterances

502

Processing the content feed to generate a semantically-rich, structured document that comprises a transcription of the speech utterances

504

During playback of the content feed, receiving a query from a user requesting information contained in the content feed

506

During playback of the content feed, processing, using a large language model, the query and the structured document to generate a response

508

Providing, for output from a user device associated with the user, the response to the query

STRUCTURED VIDEO DOCUMENTS

CROSS REFERENCE TO RELATED APPLICATIONS

This U.S. patent application is a continuation of, and claims priority under 35 U.S.C. § 120 from, U.S. patent application Ser. No. 18/177,747, filed on Mar. 2, 2023, which claims priority under 35 U.S.C. § 119(e) to U.S. Provisional Application 63/268,921, filed on Mar. 4, 2022. The disclosures of these prior applications are considered part of the disclosure of this application and are hereby incorporated by reference in their entireties.

TECHNICAL FIELD

This disclosure relates to structured video documents.

BACKGROUND

While video is common place for users to consume entertainment, news, and educational content, it remains challenging for users to use video as an informative medium due to limitations imposed by the ability to search and recall the content of the video. For informative-based tasks, users typically interact with a user interface of a timeline-based video player to scrub forward/backward through a video to locate particular content that may be of interest. To an extent, the ability to generate transcripts/captions for dialog in videos has improved the ability to search for content in a video by allowing the user to enter keyword searches to locate relevant content in the transcripts/captions. However, these user interfaces that leverage transcripts/captions to search for content lack the ability to semantically understand a query spoken (or typed) for particular content in a video— much less have the ability to fulfill the query with semantically relevant information.

SUMMARY

One aspect of the disclosure provides a computer implemented method that when executed on data processing hardware causes the data processing hardware to perform operations that include receiving a content feed including audio data that corresponds to speech utterances and processing the content feed to generate a semantically-rich, structured document. The structured document includes a transcription of the speech utterances and includes a plurality of words each aligned with a corresponding audio segment of the audio data that indicates a time when the word was recognized in the audio data. During playback of the content feed, the operations also include receiving a query from a user requesting information contained in the content feed and processing, by a large language model, the query and the structured document to generate a response to the query. Here, the response conveys the requested information contained in the content feed. The operations also include providing, for output from a user device associated with the user, the response to the query.

Implementations of the disclosure may include one or more of the following optional features. In some implementations, the operations also include extracting a segment of the transcription that includes the requested information conveyed by the response to the query, the segment of the transcription bounded by a beginning word and an ending word; identifying a starting audio segment of the audio data as the corresponding audio segment of the audio data that is aligned with the beginning word bounding the segment of the transcription; and identifying an ending audio segment of the audio data as the corresponding audio segment of the audio data that is aligned with the ending word bounding the segment of the transcription. In these implementations, providing the response to the query includes replaying back, from the user device associated with the user, the audio data from the beginning audio segment of the audio data to the ending audio segment of the audio data. The content feed may further include image data including a plurality of image frames, wherein the operations further include, while replaying back the audio data from the beginning audio segment of the audio data to the ending audio segment of the audio data, pausing playback of the plurality of image frames of the image data.

In some examples, the content feed further includes image data including a plurality of image frames and the semantically rich, structured document further includes creator-provided text recognized in one or more image frames of the plurality of image frames. Here, the creator-provided text is aligned with corresponding audio segments of the audio data to indicate a time when the creator-provided text was recognized in the one or more image frames. In these examples, processing the content feed to generate the semantically-rich, structured document may further include annotating the transcription of the speech utterances with the creator-provided text by inserting the creator-provided text between a pair of adjacent words in the transcription based on the corresponding audio segments of the audio data that are aligned with the creator-provided text recognized in the one or more image frames.

The response to the query may include a textual response conveying the requested information as a coherent, focused response to the query. In some implementations, the operations also include performing text-to-speech conversion on the textual response to generate a synthesized speech representation of the response to the query, wherein providing the response to the query for output from the user device includes audibly outputting the synthesized speech representation of the response to the query from the user device. In these implementations, the operations may further include, while audibly outputting the synthesized speech representation of the response to the query from the user device, pausing playback of the content feed. Further, the textual response to the query may further include one or more references to source material related to the requested information.

In some examples, the large language model includes a pre-trained large language model and performs few-shot learning using the structured document as context for the query to generate the response to the query. The query may include a question in a natural language and the response to the query may include a natural language response to the question.

In some implementations, processing the content feed to generate the semantically-rich, structured document includes segmenting the audio data into a plurality of audio segments, performing speaker diarization on the plurality of audio segments to predict diarization results that include a corresponding speaker label assigned to each audio segment, and indexing the transcription of the speech utterances using the corresponding speaker label assigned to each audio segment segmented from the audio data.

Another aspect of the disclosure provides a system including data processing hardware and memory hardware in communication with the data processing hardware. The memory hardware storing instructions that when executed on the data processing hardware causes the data processing hardware to perform operations that include receiving a content feed including audio data that corresponds to speech utterances and processing the content feed to generate a semantically-rich, structured document. The structured document includes a transcription of the speech utterances and includes a plurality of words each aligned with a corresponding audio segment of the audio data that indicates a time when the word was recognized in the audio data. During playback of the content feed, the operations also include receiving a query from a user requesting information contained in the content feed and processing, by a large language model, the query and the structured document to generate a response to the query. Here, the response conveys the requested information contained in the content feed. The operations also include providing, for output from a user device associated with the user, the response to the query.

This aspect may include one or more of the following optional features. In some implementations, the operations also include extracting a segment of the transcription that includes the requested information conveyed by the response to the query, the segment of the transcription bounded by a beginning word and an ending word; identifying a starting audio segment of the audio data as the corresponding audio segment of the audio data that is aligned with the beginning word bounding the segment of the transcription; and identifying an ending audio segment of the audio data as the corresponding audio segment of the audio data that is aligned with the ending word bounding the segment of the transcription. In these implementations, providing the response to the query includes replaying back, from the user device associated with the user, the audio data from the beginning audio segment of the audio data to the ending audio segment of the audio data. The content feed may further include image data including a plurality of image frames, wherein the operations further include, while replaying back the audio data from the beginning audio segment of the audio data to the ending audio segment of the audio data, pausing playback of the plurality of image frames of the image data.

In some examples, the content feed further includes image data including a plurality of image frames and the semantically rich, structured document further includes creator-provided text recognized in one or more image frames of the plurality of image frames. Here, the creator-provided text is aligned with corresponding audio segments of the audio data to indicate a time when the creator-provided text was recognized in the one or more image frames. In these examples, processing the content feed to generate the semantically-rich, structured document may further include annotating the transcription of the speech utterances with the creator-provided text by inserting the creator-provided text between a pair of adjacent words in the transcription based on the corresponding audio segments of the audio data that are aligned with the creator-provided text recognized in the one or more image frames.

The response to the query may include a textual response conveying the requested information as a coherent, focused response to the query. In some implementations, the operations also include performing text-to-speech conversion on the textual response to generate a synthesized speech representation of the response to the query, wherein providing the response to the query for output from the user device includes audibly outputting the synthesized speech representation of the response to the query from the user device. In these implementations, the operations may further include, while audibly outputting the synthesized speech representation of the response to the query from the user device, pausing playback of the content feed. Further, the textual response to the query may further include one or more references to source material related to the requested information.

In some examples, the large language model includes a pre-trained large language model and performs few-shot learning using the structured document as context for the query to generate the response to the query. The query may include a question in a natural language and the response to the query may include a natural language response to the question.

In some implementations, processing the content feed to generate the semantically-rich, structured document includes segmenting the audio data into a plurality of audio segments, performing speaker diarization on the plurality of audio segments to predict diarization results that include a corresponding speaker label assigned to each audio segment, and indexing the transcription of the speech utterances using the corresponding speaker label assigned to each audio segment segmented from the audio data.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of an example structured document including a transcription, creator-provided text, and an annotated transcription.

FIG. 5 is a flowchart of an example arrangement of operations for a method of interacting with a content feed using a structured document during playback of the content feed.

Like reference symbols in the various drawings indicate like elements.

DETAILED DESCRIPTION

Figure 1:
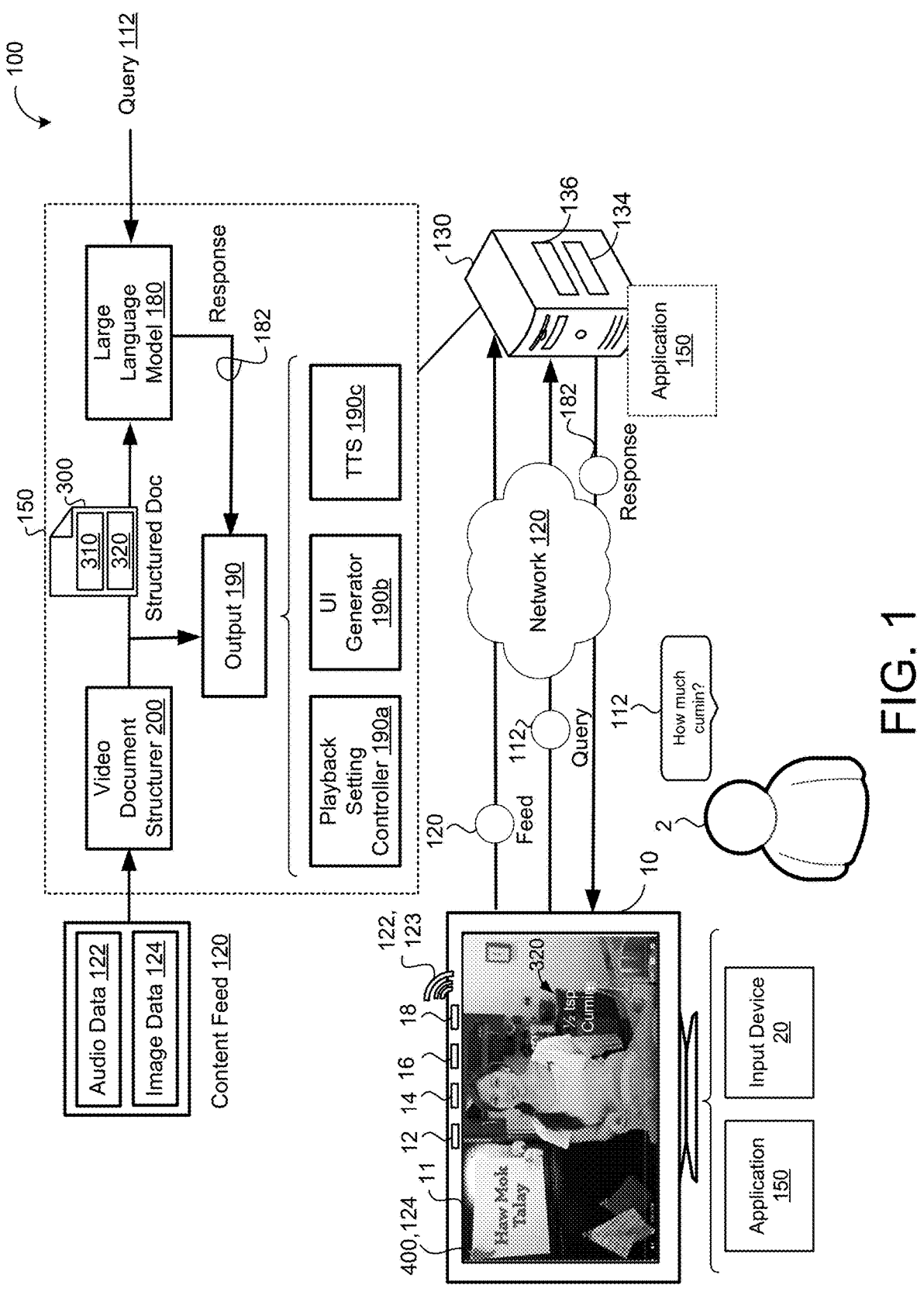
FIG. 1 is a schematic view of an example system for allowing a user to interact with a video using a structured document generated for the video.

Video players employed by media playback applications and web browsers permit a user to provide commands for controlling the playback of a video. For instance, a user may play/pause/stop the video, as well as scan forward/backward via dedicated buttons/commands or via scrubbing through a video timeline. Recent advances in automatic speech recognition (ASR) have made it possible for users to provide these video playback commands through speech. The video timeline feature enables a user to preview frame-by-frame visual content but requires the user to scrub forward and backward through the timeline multiple times to locate content of interest. For instance, if a user were viewing an instructional cooking video for preparing a particular recipe where an actor/instructor/participant (also referred to as "speaker") speaks a list of ingredients and their respective proportions, the user would have to manually scrub backward in the video to repeat the playback of the instructor speaking the list of ingredients in the event the user did not have time to internalize what proportion is required for one of the ingredients. Clearly, scrubbing through the timeline is an inefficient and time consuming process for the user to undertake to locate content of interest. Moreover, interactive timeline searching is limited to the frame-by-frame visual content of the video, without revealing audio content or high level content such as plot/scene descriptions or topics.

Some video player user interfaces leverage text transcripts and captions of audio content in the video to support keyword searches input by the user. In the above example where the user is viewing the instructional cooking video, the user could input (spoken or text) a keyword search "how much cumin?" to ascertain the proportion of cumin from a transcript of the audio content when the speaker spoke the proportion of cumin. However, suppose the instructor/actor only referenced the list of ingredients by name without specifying the proportion of each ingredient required by the recipe, and instead the creator of the instructional cooking video presented/overlaid a creator-provided graphic visually conveying the proportion of each ingredient, the user would not be able to ascertain the information he/she is looking for via the keyword search because the information would be missing from the transcript.

Additionally, the information extracted from transcribed and captioned speech responsive to a keyword search is often time-consuming to read and difficult to locate the relevant content since transcribed and captioned speech is prone to containing disfluencies and redundancies typical of speech. Since transcripts merely present long blocks of text and captions only contain sequences of short phrases, this lack of structured organization restricts the user from the ability to browse for specific topics in a video or ascertain any type of summary of the content of the video.

Some of the inherent drawbacks in the existing techniques for searching for relevant content in video can be addressed by allowing a creator of a video to imbed structured text with the aim of creating a navigable representation of the video to enable searching for content queried for by a user/viewer. In addition to transcripts and captions, a creator may imbed structured-text documents into the video that convey key topics, chapter titles, plot summaries, summaries for different segments of the video. While the use of creator-provided structured-text documents may be effective to some extent for allowing a user/viewer to locate relevant content in a video, the resources and expense required to create and imbed relevant structured-text documents into video renders the undertaking prohibitive to implement by a vast majority creators. Moreover, even when creators are willing to create structured-text documents for their video content, the content returned responsive to a user's search is only as good as the structured-text documents the creator chooses to imbed into the video. That is, it is simply not a possible feat for creators to anticipate all conceivable types of content that may be the subject of a user's search for inclusion in the structured-text documents. By the same notion, the imbedding of creator-provided structured text documents into videos fails to ever provide a truly interactive experience to the user/viewer when inputting queries to locate content of interest in the video due to an inability to semantically interpret the queries with the creator-provided structured text documents in a unified manner.

Implementations herein are directed toward automatically generating a semantically-rich, structured document for content feed (i.e., a video) to enable semantic interpretation of queries requesting information contained in the content feed. Referring to FIG. 1, a system 100 includes a user 2 viewing a content feed 120 played back on a computing/user device 10 through a media player application 150. The media player application 150 may be a standalone application executing on the user device 10 or a web-based application accessed via a web browser. In the example shown, the content feed 120 includes a recorded instructional cooking video played back on the computing device 10 for the user 2 to view and interact with. While examples herein depict the content feed 120 as an audio-visual (AV) feed (e.g., a video) that includes both audio data 122 (e.g., audio content, an audio signal, or audio stream) and image data 124 (e.g., image content or video content), the content feed 120 may be an audio-only feed that only includes audio data 122, such as, without limitation, a podcast episode or an audio book. For simplicity, the content feed 120 may be interchangeably referred to herein as a video, AV signal, AV feed, or simply AV data, unless specified otherwise.

The system 100 also includes a remote system 130 that communicates with the computing device 10 via a network 120. The remote system 130 may be a distributed system (e.g., cloud computing environment or storage abstraction) having scalable/elastic resources. The resources include computing resources 134 (e.g., data processing hardware) and/or storage resources 136 (e.g. memory hardware). In some implementations, the remote system 130 hosts (e.g., on the computing resources) the media player application 150 to coordinate playback of the content feed 120 on the computing device 10, generate a semantically rich, structured document 300 for the content feed 120, and use the structured document 300 to enable the user 10, via the computing device 10, to interact with the content feed 120 by issuing queries 112 that request information contained in the content feed 120 during playback thereof. For instance, the data processing hardware 134 of the remote system 130 may execute instructions stored on the memory hardware 136 of the remote system 130 for executing the application 150. Additionally or alternatively, the media player application 150 may execute on the computing device 10 associated with the user 2. For instance, data processing hardware 12 of the computing device 10 may execute instructions stored on memory hardware 14 of the computing device 10 for executing the application 150. Some examples of data processing hardware 12 include a central processing unit (CPU), a graphics processing unit (GPU), or a tensor processing unit (TPU).

The computing device 10 includes, or communicates with, a display 11 capable of displaying a video interface 400 for presenting the image data 124 and a speaker 18 for audible output of the audio data 122. The audio data 122 may correspond to speech utterances 123 spoken by actor(s), instructor(s), a narrator, meeting participant, host, or other individuals recorded in the video 120. Some examples of a computing device 10 include a computer, a laptop, a mobile computing device, a smart television, a monitor, a smart device (e.g., smart speaker, smart display, smart appliance), a wearable device, etc. In the example shown, the content feed 120 includes a recorded instructional cooking video played back on the computing device 10 for the user 2 to view and interact with. Implementations herein are directed toward the media player application 150 providing an interactive experience to the user 2 during playback of the instructional cooking video 120 that permits the user 2 to issue a natural language query 112 requesting information contained in the video 120, whereby the application 150 uses a semantically-rich, structured document 300 generated for the video 120 to retrieve the requested information and provide a response 182 containing the requested information to the user 2.

The user 2 may issue the query 112 as a spoken query 112 captured in streaming audio by a microphone 16 in communication with the computing device 10 and the application 150 (or another application) may perform speech recognition to convert the spoken query 112 into a corresponding textual representation of the query 112. Alternatively, the user 2 may also have the ability to input queries 112 via an input device 20 that may include a physical keyboard in communication with the computing device 10 or a virtual keyboard presented for display in the video interface 400. The input device 20 may also include a mouse, stylus, or a graphical user interface that permits the user to input a query 112 requesting information about an object displayed in the video data 124 (e.g., words in closed captions, words/phrases in creator-provided text, entities depicted in a scene of the video) by selecting or hovering over the object.

By way of example, the instructional cooking video 120 is playing a segment where the actor is mixing a list of ingredients for making a popular Thai seafood curry dish called Haw Mok Talay. The user 2 may issue the query 112, "How much cumin?", to ascertain the proportion of cumin if the user was unable to internalize the proportion of cumin recently conveyed during playback of the video 120. Without requiring the user to manually scrub backward in the video 120 to locate the segment when the proportion of cumin was conveyed, the application 150 may retrieve the proportion of cumin (i.e., the requested information) from the semantically-rich, structured document 300. For instance, the application 150 may retrieve the proportion of cumin from a transcript 310 of the audio data 122 provided that the actor explicitly spoke the proportion of cumin in a speech utterance 123. Among other types of information, the structured document 300 may also include creator-provided text 320 recognized in the image data 124. For instance, the creator of the video 120 may momentarily display creator-provided text 320 in the image data 124 that specifies the recipe calls for half a teaspoon of cumin. As such, the application 150 may retrieve the proportion of cumin from the creator-provided text 320 included in the structured document 300 regardless of whether or not the actor explicitly spoke the proportion in a speech utterance 123, and provide a response 182 to the user's query 112 that conveys a half a teaspoon of cumin is required.

The media player application 150 includes a document structurer 200, a large language model 180, and an output module 190. The document structurer 200 is configured to receive/ingest and process the audio-visual feed 120 to generate the semantically-rich, structured document 300. Notably, the document structurer 200 may generate the structured document 300 for the ingested audio-visual feed 120 automatically, and without requiring a creator of the audio-visual feed 120 to provide any structured text, or otherwise, requiring the creator to contribute in the creation of the structured document 300. As such, the document structurer 200 may ingest any new or existing content feed 120 and generate a structured document 300 on the fly without any input from the creator of the feed 120.

Figure 2:
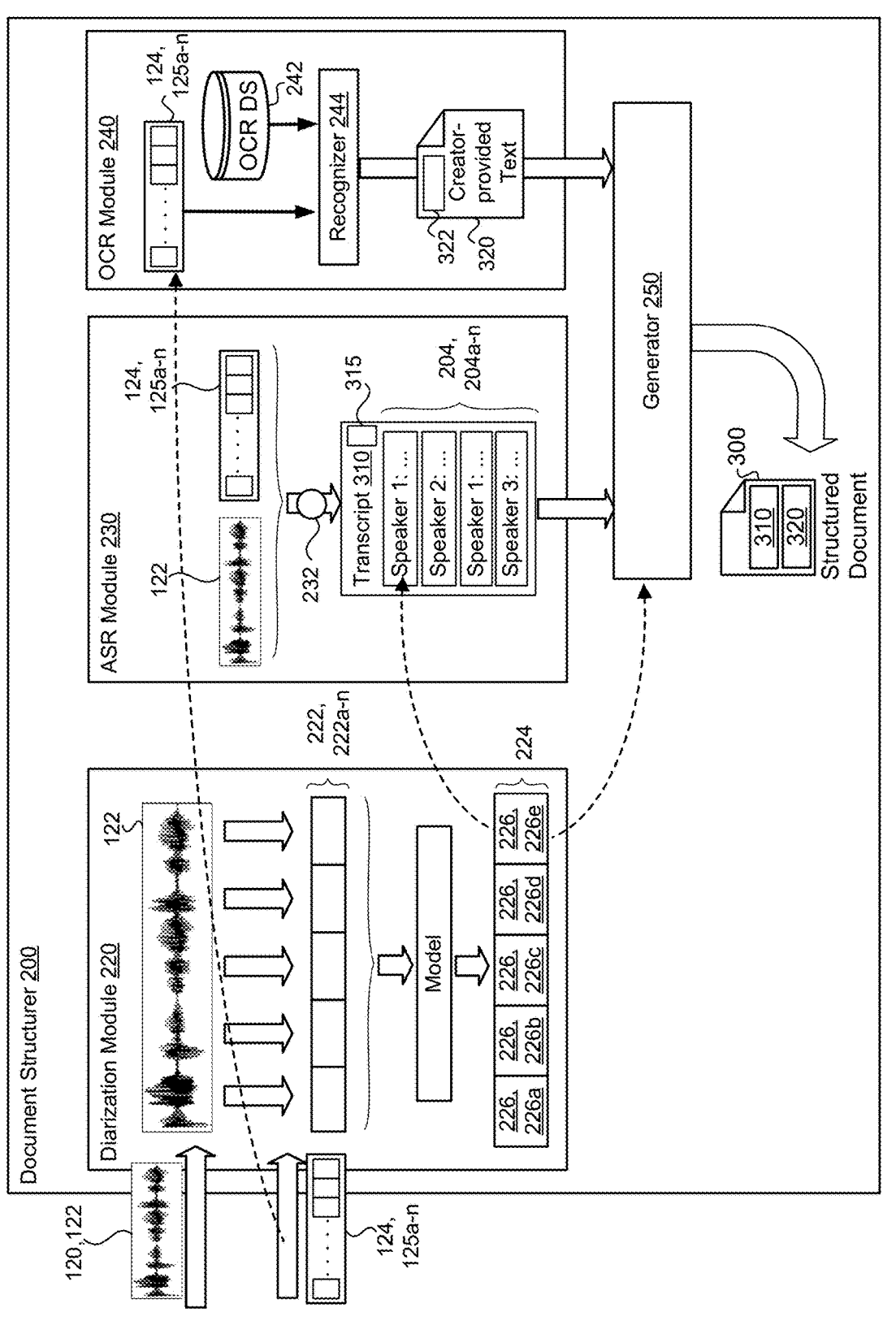
FIG. 2 is a schematic view of an example document structurer for generating a structured document from audio data and image data of an audio-visual feed.

The audio-visual feed 120 ingested by the document structurer 200 includes the audio data 122 and the image data 124. The audio data 122 may characterize the speech utterances 123 and the image data 124 may include a plurality of image frames 125, 125*a-n* (FIG. 2). As discussed above, the content feed 120 may include an audio-only feed 120 that only includes audio data 122. The structured document 300 includes a transcription 310 of the speech utterances 123. Described in greater detail below with reference to FIG. 2, the transcription 310 includes a plurality of words and the structured document 300 aligns each word in the transcription 310 with a corresponding audio segment 222 (FIG. 2) of the audio data 122 that indicates a time when the word was recognized in the audio data 122. That is, the structured document 300 includes time-stamps for each word in the transcription 310.

In some implementations, the document structurer 200 also processes the image data 124 to determine whether any creator-provided text 320 is recognized in the image data 124. In these implementations, the structured document 300 generated by the document structurer 200 will also include any creator-provided text 320 recognized in one or more image frames 125*a-n* (FIG. 2) of the image data 124. The document structurer 200 may use techniques such as object character recognition to recognize any creator-provided text 320 in each image frame 125. As used herein, creator-provided text 320 may include a textual graphic (any combination of letters, words, or other symbols) that a creator of the video overlays onto the scene depicted in an image frame in order to convey relevant content to the user/viewer 2. The creator-provided text 320 may also include any text recognized in the actual scene depicted in the image frame. The structured document 300 may align any recognized creator-provided text 320 with corresponding audio segments 222 (FIG. 2) of the audio data 122 to indicate a time when the creator-provided text 320 was recognized in the one or more image frames 125.

The document structurer 200 may additionally perform other processing techniques on the ingested audio-visual feed 120 such as, without limitation, speaker diarization, summarization, and formatting, and save the results of these processing techniques in the structured document 300. Speaker diarization answers the question "who is speaking when" and has a variety of applications including multimedia information retrieval, speaker turn analysis, audio processing, and automatic transcription of conversational speech to name a few. The document structurer 200 may leverage a text generation model that consumes the transcription 310 and/or creator-provided text 320 and outputs key topics or corresponding summaries for one or more different segments of the audio-visual feed 120. The formatting may identify different chapters/scenes in the audio-visual feed 120.

FIG. 2 shows an example of the document structurer 200 including a diarization module 220, an automated speech recognition (ASR) module 230, an object character recognition (OCR) module 240, and a generator 250. The application 150 executes the ASR module 230 to generate the transcription 310 (also referred to as transcript) of the speech utterances 123 spoken by one or more speakers (e.g., actors/participants) in the content feed 120 (e.g., audio-visual signal including audio data 122 and video data 124 or an audio-only signal including only audio data 122).

The diarization module 220 is configured to receive audio data 122 that corresponds to the utterances 123 from the speaker(s) of the content feed 120 (and optionally image data 124 representing faces of the speaker(s)), segment the audio data 122 into a plurality of segments 222, 222*a-n* (e.g., fixed-length segments or variable-length segments), and generate diarization results 224 that include a corresponding speaker label 226 assigned to each segment 222 using a probability model (e.g., a probabilistic generative model) based on the audio data 122 (and optionally the image data 124). In other words, the diarization module 220 includes a series of speaker recognition tasks with short utterances (e.g., segments 222) and determines whether two segments 222 of a given conversation were spoken by the same speaker. Simultaneously, the diarization module 220 may simultaneously execute a face tracking routine to identify which participant is speaking during which segment 222 to further optimize speaker recognition. The diarization module 220 is then configured to repeat the process for all segments 222 of the conversation. Here, the diarization results 224 provide time-stamped speaker labels 226, 226a-n for the received audio data 122 that not only identify who is speaking during a given segment 222, but also identify when speaker changes occur between adjacent segments 222.

The ASR module 230 is configured to receive the audio data 122 corresponding to the utterances 123 (and optionally the image data 124 representing faces of the speaker(s) while speaking the utterances 123). The ASR module 230 transcribes the audio data 122 into corresponding ASR results 232. Here, the ASR result 232 refers to a textual transcription of the audio data 122 (e.g., the transcription 310) or multiple candidate textual transcriptions. In some examples, the ASR module 230 communicates with the diarization module 220 to utilize the diarization results 224 associated with the audio data 122 for improving speech recognition based on utterances 123. For instance, the ASR module 230 may apply different speech recognition models (e.g., language models, prosody models) for different speakers identified from the diarization results 224. Additionally or alternatively, the ASR module 230 and/or the diarization module 220 (or some other component of the application 150) may index a transcription 310 of the audio data 122 using the time-stamped speaker labels 226 predicted for each segment 222 obtained from the diarization results 224. As shown in FIG. 2, the transcription 310 for the content feed 120 may be indexed by speaker to associate portions of the transcript 202 with the respective speaker in order to identify what each speaker said.

In some implementations, the document structurer 200 receives captions for the spoken utterances 123 that were previously generated by another application or provided by the creator of the content feed 120. The captions may be time-stamped/aligned with audio segments 222 of the audio data 122 to indicate a time when the captions for the utterances 123 were spoken. The captions may be used as the transcription 310 without requiring the ASR module 230 to process the audio data 122, or the captions may be used in combination with, or to improve, the recognition results 232 for the transcription 310 generated by processing the audio data 122. In some examples, when the captions do not include punctuation, the document structurer 200 adds punctuation to the previously generated captions for improving the accuracy of responses 182 generated by the large language model 180.

The transcription 310 of the utterances 123 for inclusion in the structured document 300 also includes alignment information 315. The alignment information 315 provides an alignment between each word 312 (FIG. 3) of a plurality of words 312, 312a-n (FIG. 3) of the transcription 310 and a corresponding audio segment 222 of the audio data 122 that indicates a time when the corresponding word was recognized.

The OCR module 240 is configured to recognize any creator-provided text 320 that may be present in one or more image frames 125a-n of the image data 124. The OCR module 240 may include an OCR machine learning model (e.g., recognizer) 244 trained to recognize any creator-provided text 320 in each image frame 125. As used herein, creator-provided text 320 may include a textual graphic (any combination of letters, words, or other symbols) that a creator of the video overlays onto the scene depicted in an image frame in order to convey relevant content to the user/viewer 2. The creator-provided text 320 may also include any text recognized in the actual scene depicted in the image frame 125. In some examples, the OCR module 240 includes an OCR datastore 242 that the OCR machine learning model 244 accesses to recognize particular fonts, symbols, or text patterns. The creator-provided text 320 recognized in the one or more image frames 125a-n may further include corresponding alignment information 322. Here, the alignment information 322 provides an alignment between any recognized creator-provided text 320 and corresponding audio segments 222 (FIG. 2) of the audio data 122 to indicate a time when the creator-provided text 320 was recognized in the one or more image frames 125.

In some scenarios, the ASR module 230 uses the recognized creator-provided text 320 and corresponding alignment information 322 to improve accuracy of the transcription 310. Referring to the example above where the content feed 120 includes the instructional cooking video, the ASR module 230 may produce recognition results 232 that misrecognize the name of the Thai dish "Haw Mok Talay" as "Hamook Taley". Similarly, previously generated captions may misrecognize the name of the dish. Some of the creator-proved text 320 recognized in the image data 320 may include the phrase "Haw Mok Talay"). In some instances, the correct spelling ("Haw Mok Talay") may be a lower confidence hypothesis in a list of candidate hypotheses included in the speech recognition results 232, whereby a match with the phrase "Haw Mok Talay" present in the recognized creator-proved text 320 boosts the confidence of the candidate hypothesis for "Haw Mok Talay" in the recognition results 232 such that it is ultimately selected for inclusion in the transcription 310.

In some implementations, the generator 250 receives the transcription 310, creator-provided text 320 recognized in the one or more image frames 125, and the corresponding alignment information 315, 322 and generates the structured document 300 by annotating the transcription 310 of the speech utterances 123 with the creator-provided text 320. In these implementations, the alignment information 315, 322 can show a likelihood of what portions of the speech utterances 123 the creator-provided text 320 relates to. For instance, the generator 250 may insert the creator-provided text 320 between a pair of adjacent words in the transcription 310 based on the corresponding audio segments 222 of the audio data 120 that are aligned with the creator-provided text 320 recognized in the one or more image frames.

FIG. 3 shows an example semantically-rich, structured document 300 generated by the document structurer 200 of FIGS. 1 and 2 for the audio-visual feed 120 corresponding to the instructional cooking video. The transcription 310 relates to the utterances 123 spoken by the speaker discussing some of the steps for making a satay marinade for the Thai dish "Haw Mok Talay". The transcription 310 includes a plurality of words 312, 312a-n and the corresponding alignment information 315 provides the alignment between each word 312 of the plurality of words 312a-n and a corresponding audio segment 222 of the audio data 122 that indicates a time when the corresponding word 312 was recognized. The creator-provided text 320 includes "1.5 tsp coriander" and "0.5 tsp cumin" indicating the respective proportions of coriander and cumin required for the satay marinade. Notably, as the speaker never spoke any utterances 123 conveying these proportions, they are not included in the transcription 310. The corresponding alignment information 325 provides the alignment between the creator-provided text 320 and corresponding audio segments 222 (FIG. 2) of the audio data 122 to indicate a time when the creator-provided text 320 was recognized in the one or more image frames 125.

In the example shown, the structured document 300 also includes an annotated transcription 330 that uses the alignment information 315, 325 to insert the creator-provided text 320 between a pair of adjacent words (e.g., "anything" and "Coriander") in the transcription 310 based on the corresponding audio segments 222 of the audio data 120 that are aligned with the creator-provided text 320 recognized in the one or more image frames. Here, the annotated transcription 330 includes creator-provided text 320 inserted into a relevant position of the transcription 310.

Referring back to FIG. 1, in some implementations, during playback of the content feed (e.g., audio-visual feed) 120, the large language model 180 is configured to receive the semantically-rich, structured document 300 and the query 112 issued by the user 2 as input, and generate, as output, the response 182 to the query 112 that conveys requested information contained in the content feed 120. In some examples, the query 112 includes a question in a natural language and the response 182 to the query 112 includes a natural language response that provides an answer to the question. For instance, the response 182 to the query 112 may include a textual response generated by the large language model 180 that conveys the requested information as a coherent, focused response to the query 112. In some examples, the large language model 180 is further capable of augmenting the coherent/focused response 182 to the query 112 with references to source material to highlight authoritativeness of the information contained in the response 182. That is, the textual response 182 to the query 112 may include one or more references to source material related to the requested information, such as links to entities mentioned in the response 182 that may direct the user 2 to additional information. In addition to generating text to provide a natural language response/answer 182 to a natural language query 112, the large language model 182 may perform other generative tasks such as generating natural language text that summarizes one or more portions of the structured document 300.

The large language model 180 may include a pre-trained large language model 180 that is pre-trained on general world knowledge using one or more generative tasks (i.e., multi-task learning) to learn highly effective contextual representations. As such, the large language model 180 may include a multi-task unified model (MUM). The pre-trained large language model 180 may be based on Transformer or Conformer models, or other encoding/decoding architectures having multi-head attention mechanisms. For instance, the pre-trained large language model may include one encoding branch for encoding the structured document 300, another encoding branch for encoding the query 112, and a shared decoder that receives both the encodings to retrieve/generate a response that answers the query. Notably, Transformer/Conformer models are able to be parallelized efficiently for training large-scale language models that are proven to generalize better, and achieve significantly better performance, compared to language models based on autoregressive neural network architectures such as recurrent neural network models. The pre-trained neural network model 180 may include over one-billion parameters, and may exceed a ceiling of one-trillion parameters.

Implementations herein are directed toward the pre-trained large language model 180 performing few-shot learning that uses the structured document 300 as context for generating the response 182 to the query 180. That is, few-shot learning fine-tunes parameters of the pre-trained large language model 180 so that the language model 180 can be applied to the downstream task of retrieving relevant information contained in the audio-video feed responsive to the query 112 issued by the user 2. The use of few-shot learning is particularly useful for tasks where limited training data is available since the language model 180 is able to generalize well based on the structured document 300 providing labeled examples to improve the retrieval of relevant information, e.g., information contained in the audio-visual feed 120 the user 2 is currently viewing. With few-shot learning, the query 112 and the structured document 300 are provided as an input pair to the pre-trained large language model 300 such that the structured document is labeled as being relevant in some way for generating the response 182 as output. The large language model 180 is also capable of performing a zero-shot learning task where the language model 180 may default to its knowledge of the world when generating a response 182 to the query 110.

After the large language model 180 generates the response 182, the output module 190 is configured to provide the response 182 for output from the user computing device. The output module 190 may include any combination of a playback setting controller 190a, a user interface (UI) generator 190b, and a text-to-speech (TTS) system 190c. Continuing with the example where the audio-visual feed 120 includes the instructional cooking video, the user 2 may provide the query 112, "What, how were they toasted?" upon realizing that a detail spoken by the actor in the video about how coriander seeds used in the recipe are toasted was missed. The response 182 may include the answer "They were toasted in a dry sauté pan". In some examples, the output module 190 receives the response 182 and the structured document 300 as input, and extracts a segment of the transcription 310 (and/or a segment of the annotated transcription 330 (FIG. 3)) that includes the requested information conveyed by the response to the query 112. For instance, the segment extracted from the transcription 310 may include "You want to toast them in a dry sauté pan", wherein the segment is bounded by the beginning word "You" and the ending word "pan". Accordingly, the output module 190 may then identify both a starting audio segment 222 (FIG. 2) of the audio data 122 as a corresponding audio segment that is aligned with the beginning word bounding the segment of the transcription, and an ending audio segment 222 of the audio data 122 that is aligned with the ending word bounding the segment of the transcription 310. Using the identified starting and ending audio segments 222, the output module 190 may instruct the playback setting controller 190a to replay back, as audible output from the speaker 18, the audio data 122 from the beginning audio segment to the ending audio segment such that the utterance 123 "You want to toast them in a dry sauté pan" is replayed back to convey the response 182 to the query 110. Notably, the playback settings controller 190a may pause playback of the plurality of image frames of the image data 125 while replaying back the relevant audio data 120. In some examples, the controller 190a pauses playback of the audio-video feed 110 responsive to receiving the query 110.

In some additional examples, the output module 190 instructs the TTS system 190c to perform TTS conversion on the textual response 182 output from the large language model 180 to generate a synthesized speech representation of the response 182 to the query 112. The output module 190 may use the TTS system 190c in scenarios when the requested information conveyed by the response to the query 112 is not present in the transcription 310, and thus, was never conveyed in the spoken utterances 123. As such, there is no opportunity to replay back any portion of the audio data 122 to convey the requested information conveyed by the response 182. For instance, and with reference to FIG. 3, a response 182 to the query 112, "How much cumin?" may only be ascertained by the large language model 180 from the creator-provided text 320 as evidenced by the annotated transcription 330. In this example, the output module 190 may receive the textual response 182, "half a teaspoon of cumin seeds", generated by the large language model 180 as an answer to the query 112, and instruct the TTS system 190c to perform text-to-speech conversion on the textual response 182 to generate the synthesized speech representation of the response 182 to the query 112. Accordingly, the media player application 150 may audibly output the synthesized speech representation from the speaker 18 of the computing device 10. Notably, the playback settings controller 190a may also pause playback of the audio-visual feed 120 entirely while the synthesized speech representation conveying the response 182, "half a teaspoon of cumin seeds", is being audibly output from the speaker 18 of the computing device 10. In some examples, the controller 190a pauses playback of the audio-video feed 110 responsive to receiving the query 110.

Additionally, the output module 190 may instruct the UI generator 190b to generate a graphic of the textual response 182 and present the graphic of the textual response 182 in the video interface 400 displayed on the display 11 of the computing device 10 during playback of the audio-visual feed 120. Here, the user 2 may simply read the graphic of the textual response 182 presented in the video interface 400 while viewing the video 120. The textual response 182 may include one or more references to source materials related to the requested information. For instance, the graphic of the textual response 182 presented in the video interface 400 may provide hyperlinks to references source materials related to the requested information. The user 2 may simply hover (e.g., via a mouse) over, or touch, a word of interest in the textual response presented in the video interface 400 to view additional information or be directed to another source, e.g., a webpage.

Figure 4:
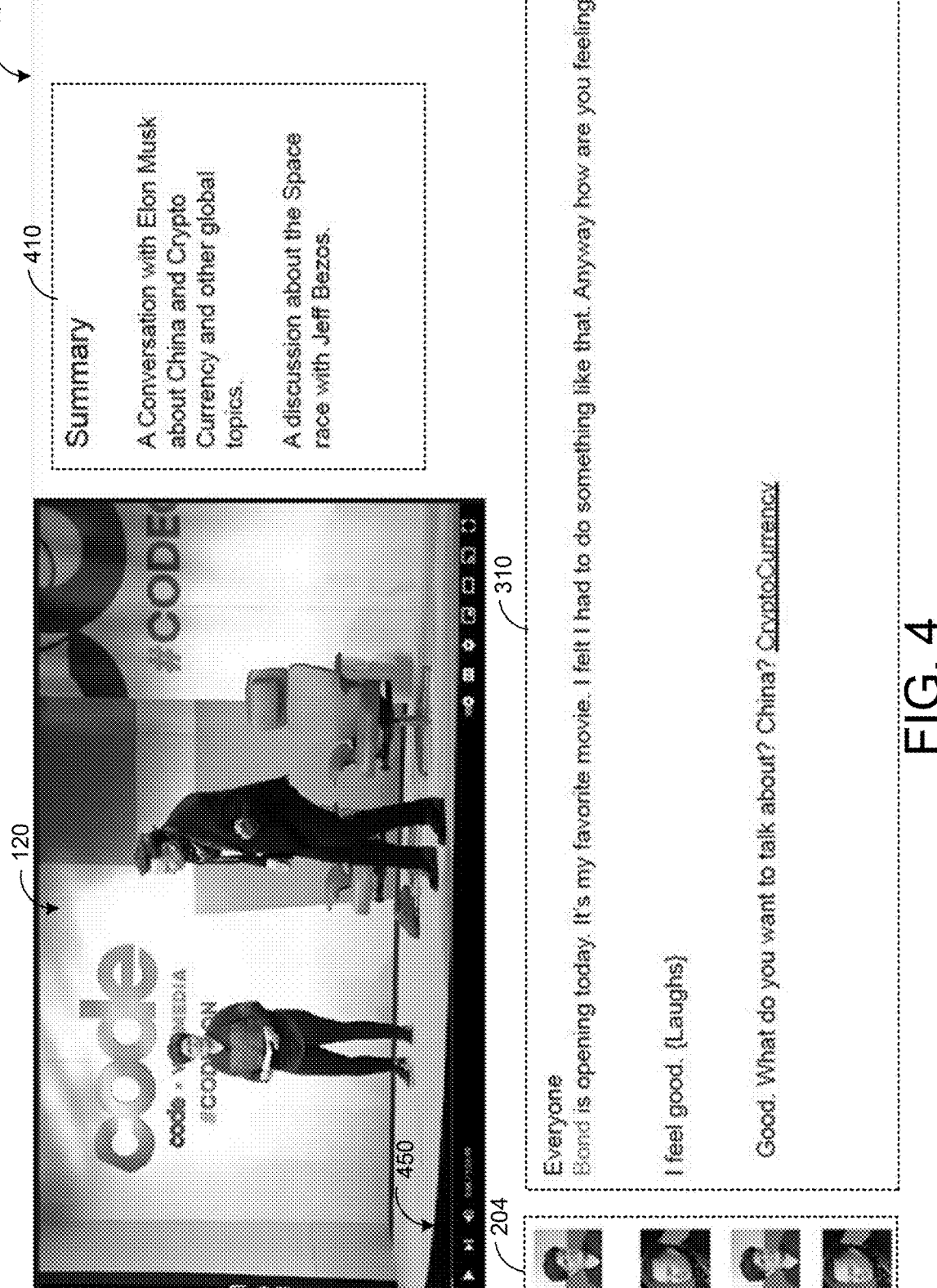
FIG. 4 is a schematic view of an example video interface presenting information from a structured document generated for a video while playing back the video.

FIG. 4 provides an example video interface 400 that the media player application 150 displays on the display 11 of the computing device 10 during playback of an audio-visual feed 120. In this example, the media player application 150 also displays, in the video interface 400, information from a semantically-rich, structured document 300 generated for the audio-visual feed 120 to allow the user 2 to interact with the structured document 300 during playback of the audio-visual feed 120. For instance, a transcription 310 of utterances spoken by two different speakers may be displayed, as well as corresponding speaker labels 204 indicating which portions of the transcription 310 were spoken by each speaker. The structured document 300 may further provide multimodal interactions such as adding hyperlinks to specific terms or entities recited in the transcription 310 that may be relevance to the user 2. For instance, additional information about the term "cryptocurrency" may be explored by the user 2 via selecting or hovering a mouse over the term. Here, the video interface 400 may populate a definition for cryptocurrency or a snippet from a Wikipedia page about cryptocurrency.

The structured document 300 may further provide a summary 410 of relevant chapters/sections/scenes of the audio-visual feed 120 for presentation in the video interface 400. Here, the summary 410 may be generated by the large language model 180 of FIG. 1 based on information extracted from the transcription 310, creator-provided text 320, and/or annotated transcription 320. The user 2 may select the one of the summaries 410, and the video player may advance to that portion of the video.

The video interface 400 of the media player application 150 also provides playback setting controls 450 that allow the user 2 to control playback of the audio-visual feed 450. For instance, the playback setting controls 450 may include buttons for playing, scanning forward/backward, pause, as well as a video timeline that the user 2 may manipulate to scrub through the video.

FIG. 5 provides a flowchart of an example arrangement of operations for a method 500 of interacting with a content feed 120 using a structured document 300 during playback of the content feed 120. At operation 502, the method 500 includes receiving a content feed 120 that includes audio data 122. The audio data 120 corresponds to speech utterances 123. The content feed 120 may include an audio-visual feed that additionally includes image data 124, the image data 124 including a plurality of image frames 125a-n.

At operation 504, the method 500 includes processing the content feed 120 to generate a semantically-rich, structured document 300. Here, the structured document 300 includes a transcription 310 of the speech utterances 123. The transcription 310 may include a plurality of words 312 each aligned with a corresponding audio segment 222 of the audio data 122 that indicates a time when the word 312 was recognized in the audio data 122.

At operation 506, during playback of the content feed 120, the method 500 includes receiving a query 112 from a user 2 requesting information contained in the content feed. At operation 508, during playback of the content feed 120, the method 500 includes processing, by a large language model 180, the query 112 and the structured document 300 to generate a response 182 to the query 112. Here, the response 182 conveys the requested information contained in the content feed 120. At operation 510, the method includes providing, for output from a user device 10 associated with the user 2, the response 182 to the query 112.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
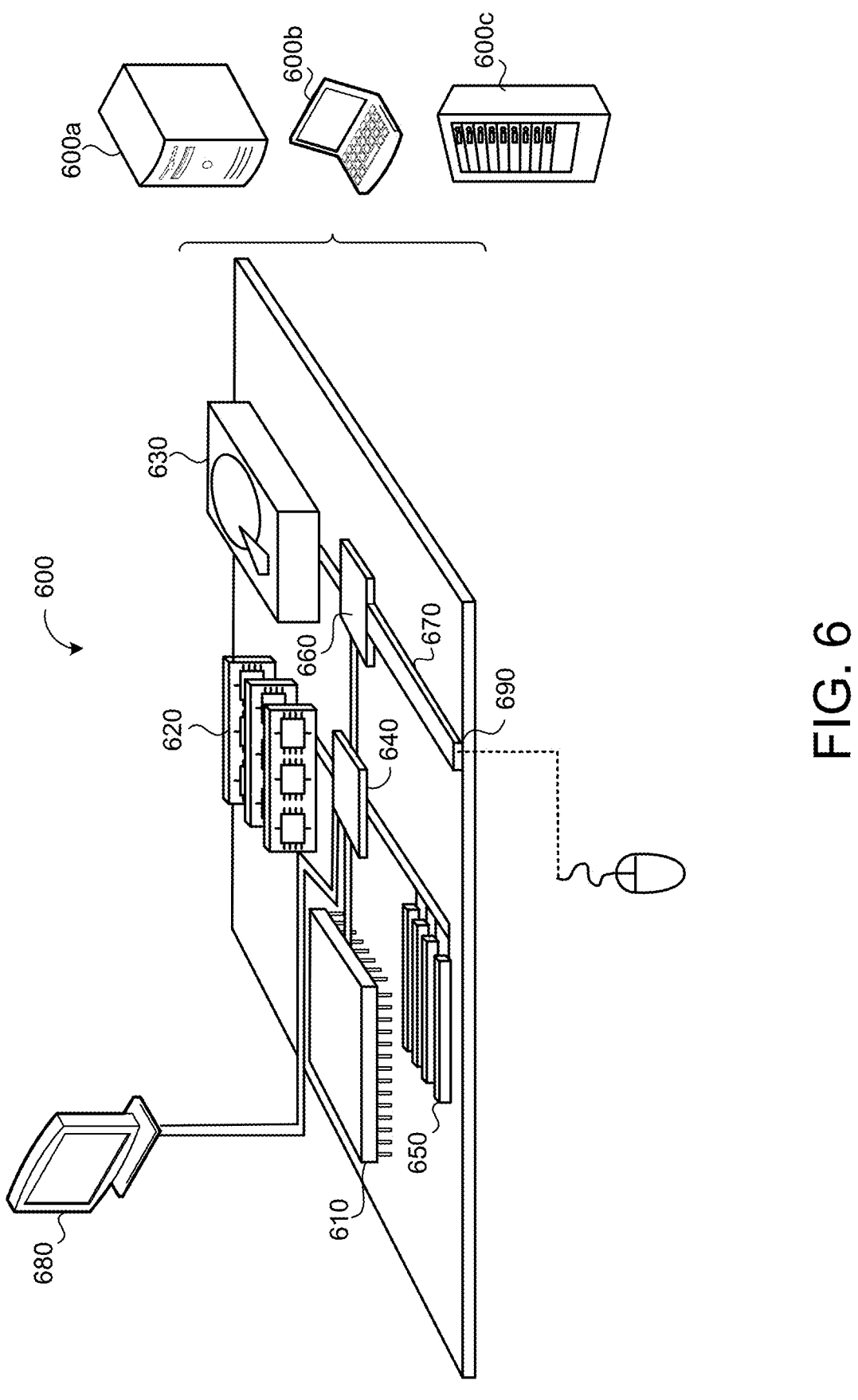
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
 receiving image data comprising an image frame;
 processing the image data to generate a structured document, the structured document comprising creator-provided text recognized in the image frame;
 receiving a query from a user requesting information contained in the image data; and
 processing the query and the structured document to generate a natural language response to the query, wherein generating the natural language response comprises generating text based on the creator-provided text recognized in the image frame, the generated text conveying the requested information contained in the image data.

2. The computer-implemented method of claim 1, wherein the operations further comprise providing, for output from a user device associated with user, the natural language response to the query.

3. The computer-implemented method of claim 1, wherein processing the query and the structured document to generate the natural language response to the query comprises using a large language model to process the query and the structured document to generate the natural language response to the query as output from the large language model.

4. The computer-implemented method of claim 3, wherein the large language model comprises a pre-trained large language model.

5. The computer-implemented method of claim 4, wherein the pre-trained large language model generates the natural language response to the query by performing few-shot learning using the structured document as context for the query.

6. The computer-implemented method of claim 3, wherein the large language model comprises an encoding/decoding architecture having multi-head attention mechanisms.

7. The computer-implemented method of claim 3, wherein the large language model comprises a Transformer-based large language model.

8. The computer-implemented method of claim 1, wherein the generated text further conveys the requested information as a coherent, focused response to the query.

9. The computer-implemented method of claim 1, wherein:
 the query comprises a question in a natural language; and
 the natural language response to the query responds to the question.

10. The computer-implemented method of claim 1, wherein the generated text comprises a summary of the image data based on the creator-provided text.

11. A system comprising:
 data processing hardware; and
 memory hardware in communication with the data processing hardware, the memory hardware storing instructions that when executed on the data processing hardware cause the data processing hardware to perform operations comprising:
  receiving image data comprising an image frame;
  processing the image data to generate a structured document, the structured document comprising creator-provided text recognized in the image frame;
  receiving a query from a user requesting information contained in the image data; and
  processing the query and the structured document to generate a natural language response to the query, wherein generating the natural language response comprises generating text based on the creator-provided text recognized in the image frame, the generated text conveying the requested information contained in the image data.

12. The system of claim 11, wherein the operations further comprise providing, for output from a user device associated with user, the natural language response to the query.

13. The system of claim 11, wherein processing the query and the structured document to generate the natural language response to the query comprises using a large language model to process the query and the structured document to generate the natural language response to the query as output from the large language model.

14. The system of claim 13, wherein the large language model comprises a pre-trained large language model.

15. The system of claim 14, wherein the pre-trained large language model generates the natural language response to the query by performing few-shot learning using the structured document as context for the query.

16. The system of claim 13, wherein the large language model comprises an encoding/decoding architecture having multi-head attention mechanisms.

17. The system of claim 13, wherein the large language model comprises a Transformer-based large language model.

18. The system of claim 11, wherein the generated text further conveys the requested information as a coherent, focused response to the query.

19. The system of claim 11, wherein:

the query comprises a question in a natural language; and the natural language response to the query responds to the question.

20. The system of claim 11, wherein the generated text comprises a summary of the image data based on the creator-provided text.

\* \* \* \* \*